United States Patent
Takahashi

(10) Patent No.: US 9,887,554 B2
(45) Date of Patent: Feb. 6, 2018

(54) POWER TRANSMITTING APPARATUS, POWER RECEIVING APPARATUS, CONTROL METHODS THEREFOR, PROGRAMS, AND STORAGE MEDIUM

(71) Applicant: CANON KABUSHIKI KAISHA, Tokyo (JP)

(72) Inventor: Naoto Takahashi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 259 days.

(21) Appl. No.: 14/787,432

(22) PCT Filed: May 29, 2014

(86) PCT No.: PCT/JP2014/064898
§ 371 (c)(1),
(2) Date: Oct. 27, 2015

(87) PCT Pub. No.: WO2014/208303
PCT Pub. Date: Dec. 31, 2014

(65) Prior Publication Data
US 2016/0087450 A1    Mar. 24, 2016

(30) Foreign Application Priority Data

Jun. 25, 2013   (JP) .................. 2013-133098

(51) Int. Cl.
*H01F 27/42*    (2006.01)
*H02J 5/00*    (2016.01)
(Continued)

(52) U.S. Cl.
CPC .............. *H02J 5/005* (2013.01); *B60L 11/182* (2013.01); *B60L 11/1838* (2013.01);
(Continued)

(58) Field of Classification Search
CPC .... B60L 11/182; B60L 2240/80; Y04S 30/14; H02J 5/005; H02J 7/025; H02J 2007/0001; H02J 17/00; Y02T 10/7005; Y02T 90/16
(Continued)

(56) References Cited

U.S. PATENT DOCUMENTS 9,553,636 B2    1/2017    Maikawa et al.
2009/0133942 A1    5/2009    Iisaka et al.
(Continued)

FOREIGN PATENT DOCUMENTS

CN    103098344 A    5/2013
JP    2013-038854 A    2/2013
(Continued)

OTHER PUBLICATIONS

Korean Office Action dated Dec. 20, 2016 in Korean Application No. 10-2016-7001136.
(Continued)

*Primary Examiner* — Jared Fureman
*Assistant Examiner* — Duc M Pham
(74) *Attorney, Agent, or Firm* — Fitzpatrick, Cella, Harper & Scinto

(57) ABSTRACT

A power transmitting apparatus that transmits electric power to a power receiving apparatus performs wireless communication with the power receiving apparatus, transmits at least one type of electric power having a power value specific to the power transmitting apparatus, and performs a determination as to whether or not to transmit electric power required by the power receiving apparatus to the power receiving apparatus. The power transmitting apparatus receives at least one type of converted value converted from the electric power received by the power receiving appara-
(Continued)

tus, and performs the determination based on the converted value and the specific power value.

17 Claims, 9 Drawing Sheets

(51) Int. Cl.
    *B60L 11/18*     (2006.01)
    *H02J 7/02*     (2016.01)
    *H02J 17/00*     (2006.01)
    *H02J 7/00*     (2006.01)

(52) U.S. Cl.
    CPC ........... *B60L 11/1846* (2013.01); *H02J 7/025* (2013.01); *H02J 17/00* (2013.01); *B60L 2240/80* (2013.01); *H02J 2007/0001* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
    USPC ........................................................ 307/104
    See application file for complete search history.

(56) References Cited

U.S. PATENT DOCUMENTS

| | | | | |
|---|---|---|---|---|
| 2009/0271047 | A1* | 10/2009 | Wakamatsu | H02J 5/005 700/295 |
| 2012/0021707 | A1* | 1/2012 | Forrester | H04W 52/30 455/103 |
| 2012/0191387 | A1* | 7/2012 | Yamanaka | G06Q 50/06 702/62 |
| 2013/0033235 | A1* | 2/2013 | Fukaya | H02J 17/00 320/162 |
| 2014/0103871 | A1 | 4/2014 | Maikawa et al. | |
| 2016/0087448 | A1 | 3/2016 | Takahashi | |

FOREIGN PATENT DOCUMENTS

| | | |
|---|---|---|
| JP | 2013-038924 A | 2/2013 |
| WO | 2012/165242 A1 | 12/2012 |

OTHER PUBLICATIONS

Soljacic, Marin, et al. "Wireless Technology Developed to Transmit Power Lights up a 60W Bulb in Tests", Nikkei Electronics, vol. 966, Dec. 3, 2007, pp. 117 to 129.

Chinese Office Action dated Jul. 20, 2017 in Chinese Application No. 201480035679.6.

* cited by examiner

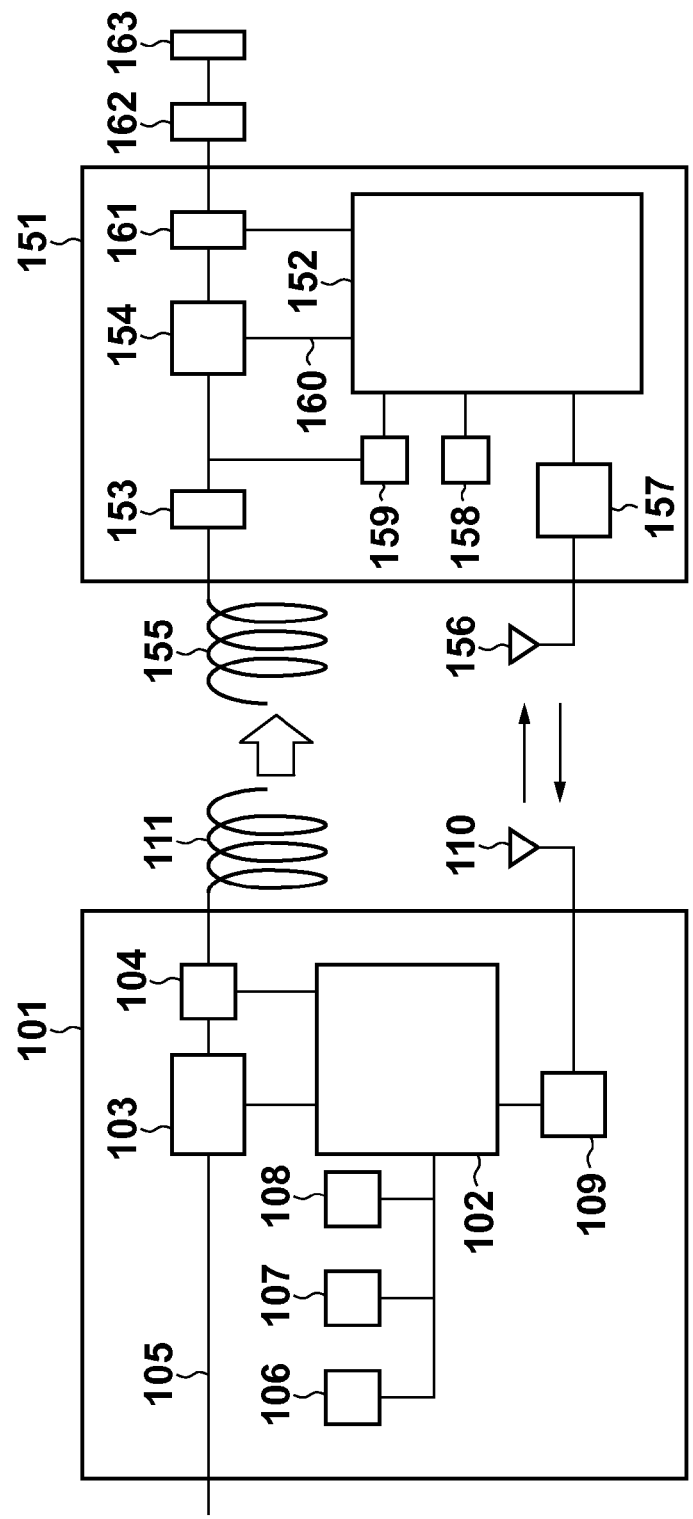

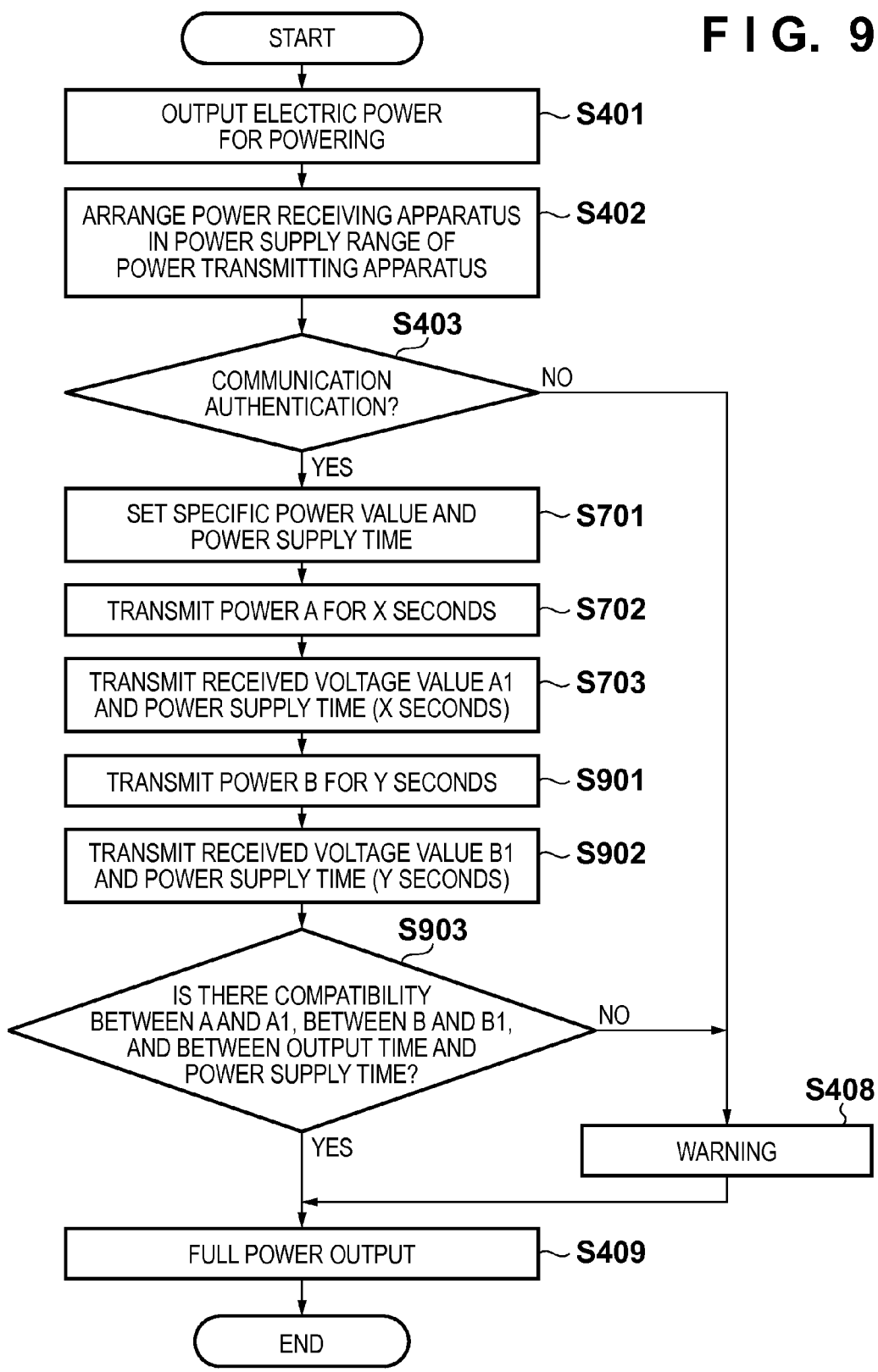

POWER TRANSMITTING APPARATUS, POWER RECEIVING APPARATUS, CONTROL METHODS THEREFOR, PROGRAMS, AND STORAGE MEDIUM

TECHNICAL FIELD

The present invention relates to a power transmitting apparatus that transmits electric power in a non-contact manner, a power receiving apparatus that receives electric power in a non-contact manner, control methods therefor, programs and storage media.

BACKGROUND ART

The wireless power transmission technique has been widely studied and developed since the Massachusetts Institute of Technology (MIT) conducted a demonstration experiment of wireless power transmission using electromagnetic resonance in 2007. The wireless power transmission, which is used in combination with wireless communication, is attracting attention as a technique for implementing electric power transmission in a completely wireless manner (Wireless Power Transmission Technique Developed to Light 60 W Bulb in Experiment, Nikkei Electronics, vol. 966, Dec. 3, 2007).

Furthermore, in recent years, the wireless power transmission technique is increasingly used in a wide variety of applications such as charging electric vehicles and hybrid vehicles, transmitting power to such vehicles, and charging small devices such as smart phones. Under the circumstances, techniques for safely transmitting electric power have also been developed. For example, Japanese Patent Laid-Open No. 2013-38924 discloses a technique in which a power supply device installed on the ground performs authentication and power supply with respect to a vehicle that has entered a power supply range of the power supply device. Specifically, a communication unit provided in the power supply device performs communication with the vehicle, and performs authentication to determine whether or not the vehicle is a vehicle to which electric power can be supplied. Subsequently, a power supply unit provided in the power supply device supplies electric power to the vehicle. The power supply device receives, from the vehicle, information regarding the amount of electric power received by the vehicle. If it is confirmed that the amount of electric power is equal to an amount of electric power obtained by subtracting a loss between the power supply unit and the power receiving unit, the power supply device determines that the vehicle is a vehicle that has been successfully authenticated, and continues the supply of power.

With the conventional technique described above, however, the vehicle authenticated by the communication unit may not necessarily be the same as the vehicle to which the power supply unit is supplying power. In the case where multiple power supply devices are located close to each other and thus the communication ranges of the communication units of the power supply devices overlap with each other, multiple vehicles in the power supply ranges of the power supply units of the multiple power supply devices cannot recognize to which communication unit the communication and authentication have been performed. That is, such a vehicle may be accidentally authenticated by a communication unit that is not connected to the power supply unit that can supply power in the range in which the vehicle is present. Once the power supply device starts charging in this state, the power supply device continues power supply if the amount of power supplied and the amount of power received are accidentally determined as compatible.

As a consequence, a problem occurs if a large vehicle such as a truck or a bus and a small vehicle such as a light automobile are in the power supply ranges of adjacently arranged power supply devices. That is, because the battery capacity varies according to the vehicle size, if electric power is supplied from a power supply device that is different from the intended one, the battery of the large vehicle may not be charged, or the battery of the small vehicle may be damaged. Specifically, the power supply devices usually have a communication range larger than a power supply range, and thus the vehicle authenticated through communication may not be the same as the vehicle that is present in the power supply range. Accordingly, the power supply devices need to check whether a vehicle that is in their power supply range is the same as the vehicle authenticated through communication.

SUMMARY OF INVENTION

The present invention reliably determines whether a power receiving apparatus arranged in a power supply range of a power transmitting apparatus is a power receiving apparatus that has been successfully authenticated.

According to first aspect of the present invention, there is provided a power transmitting apparatus that transmits electric power to a power receiving apparatus, the power transmitting apparatus comprising: communication means for performing wireless communication with the power receiving apparatus; power transmission means for transmitting at least one type of electric power having a power value specific to the power transmitting apparatus; and determination means for performing a determination as to whether or not to transmit electric power required by the power receiving apparatus to the power receiving apparatus, wherein the communication means receives at least one type of converted value converted from the electric power received by the power receiving apparatus, and the determination means performs the determination based on the converted value and the specific power value.

According to second aspect of the present invention, there is provided a power receiving apparatus that receives electric power from a power transmitting apparatus, the power receiving apparatus comprising: communication means for performing wireless communication with the power transmitting apparatus; and power receiving means for receiving at least one type of electric power having a power value from the power transmitting apparatus, wherein the communication means transmits at least one type of converted value converted from the electric power received by the power receiving means.

According to third aspect of the present invention, there is provided a method for controlling a power transmitting apparatus that transmits electric power to a power receiving apparatus, the method comprising: performing wireless communication with the power receiving apparatus; transmitting at least one type of electric power having a power value specific to the power transmitting apparatus; and performing a determination as to whether or not to transmit electric power required by the power receiving apparatus to the power receiving apparatus, wherein in the communication step, at least one type of converted value converted from the electric power received by the power receiving means is received, and in the determining step, the determination is performed based on the converted value and the specific power value.

According to fourth aspect of the present invention, there is provided a method for controlling a power receiving apparatus that receives electric power from a power transmitting apparatus, the method comprising: performing wireless communication with the power transmitting apparatus; and receiving at least one type of electric power having a power value from the power transmitting apparatus, wherein in the communication step, at least one type of converted value converted from the received electric power is transmitted.

Further features of the present invention will become apparent from the following description of exemplary embodiments (with reference to the attached drawings).

BRIEF DESCRIPTION OF DRAWINGS

FIG. 1 is a diagram showing a configuration of a non-contact power transmitting and receiving system according to a first embodiment of the present invention.

FIG. 9 is a flowchart 2 of operations performed between the power transmitting apparatus and the power receiving apparatus according to the second embodiment.

DESCRIPTION OF EMBODIMENTS

First Embodiment

Figure 2A:
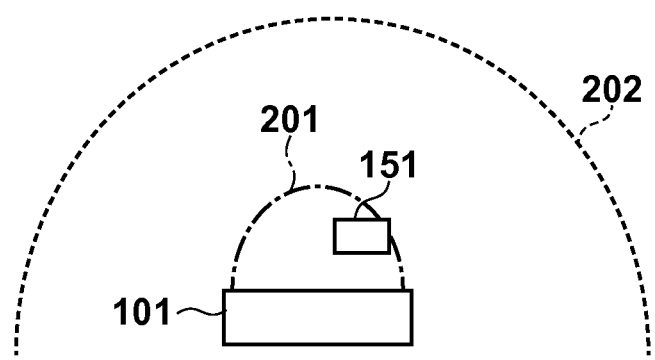
FIGS. 2A and 2B are diagrams showing a power supply range (range up to which electric power can be transmitted) and a communication range.

A first embodiment will be described with reference to FIGS. 1 to 5. FIG. 1 is a diagram showing a configuration of a non-contact power transmitting and receiving system according to the present embodiment. As shown in FIG. 1, the non-contact manner power transmitting and receiving system according to the present embodiment includes a power transmitting apparatus 101 and a power receiving apparatus 151. The power transmitting apparatus 101 includes a communication unit 109 that performs communication via Bluetooth®, WiFi, near field communication (NFC) or the like with the use of a communication antenna 110. The communication scheme used by the communication unit 109 may be any communication scheme as long as it is wireless. By using the wireless communication scheme, communication authentication is performed to determine a power receiver to which electric power can be supplied. An electric power supply line (hereinafter referred to as a "supply line") 105 supplies electric power to a power transmitting unit 103. The power transmitting unit 103 amplifies the supplied electric power, and transmits the amplified electric power to a transmit power adjusting unit (hereinafter, referred to as an "adjusting unit") 104. The adjusting unit 104 adjusts the electric power received from the power transmitting unit 103 to electric power having a desired power value. The adjusted electric power is transmitted with the use of a power transmitting antenna 111.

A central processing unit (hereinafter, referred to as a "CPU") 102 controls operations performed in the power transmitting apparatus 101. An authentication pattern generating unit (hereinafter, referred to as a "generating unit") 106 generates authentication patterns such as supply power and power output time when it is determined whether or not an intended power receiving apparatus is arranged in a power supply range (hereinafter, referred to as "apparatus authentication"). An authentication determining unit (hereinafter, referred to as a "determining unit") 107 stores in advance a loss value between the power transmitting antenna 111 and a power receiving antenna when electric power is supplied from the power transmitting apparatus 101 to the power receiving apparatus 151, and a loss value in the power receiving apparatus 151. The determining unit 107 performs apparatus authentication based on the stored loss values. In some cases, the efficiency of power supply may vary depending on the location of the power receiving apparatus 151 in the power supply range. In such a case, the determining unit 107 supplies multiple electric powers, and performs apparatus authentication in consideration of the attenuation ratio of each electric power. A timer unit 108 manages the time during which electric power is supplied from the power transmitting apparatus 101 to the power receiving apparatus 151.

The power receiving apparatus 151 can receive electric power supplied from the power transmitting apparatus 101 by being arranged in a power supply range of the power transmitting apparatus 101. The power receiving apparatus 151 that has received the supply of power supplies electric power to a load such as a battery 163 so as to charge the battery. A CPU 152 controls operations performed in the power receiving apparatus 151. The power receiving apparatus 151 receives electric power by using a power receiving antenna 155. The received electric power is transmitted to a rectifier 153. The rectifier 153 rectifies and converts the electric power received from the power transmitting apparatus 101 into direct current power having a rectified voltage value and a current value. A constant voltage circuit 154 supplies the direct current power obtained through rectification by the rectifier 153 at a constant voltage. A communication unit 157 performs communication via Bluetooth®, WiFi, NFC or the like with the use of a communication antenna 156. The communication scheme used by the communication unit 157 may be any scheme. A timer unit 158 measures how long the voltage value obtained through rectification of the electric power received from the power transmitting apparatus 101 by the rectifier 153 is output. A voltage detecting unit 159 measures the voltage obtained as a result of the electric power received from the power transmitting apparatus 101 being rectified by the rectifier 153. A switch 161 is turned on so as to provide the electric power received from the power transmitting apparatus 101 to the battery 163, which is a load. A charge control unit 162 controls charging of the battery, which is a load.

Figure 2B:
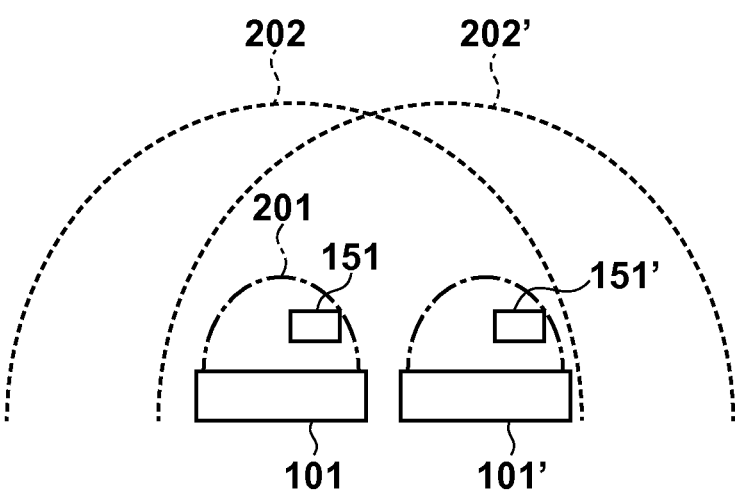

FIGS. 2A and 2B show a power supply range 201 (indicated by a dashed dotted line) up to which electric power from the power transmitting apparatus 101 can be transmitted, and a communication range 202 (indicated by a dotted line). As can be seen from FIGS. 2A and 2B, the communication range 202 is larger than the power supply range 201, and thus communication can be performed within the power supply range. As shown in FIG. 2A, in the case where there is one power receiving apparatus 151 within the power supply range of the power transmitting apparatus 101, the power receiving apparatus 151 can receive supply of power from the power transmitting apparatus 101 and at the same time, can start communication only with the power transmitting apparatus 101. However, as shown in FIG. 2B, in the case where there is a power transmitting apparatus 101' within the communication range 202 of the power transmitting apparatus 101, and the power transmitting apparatus 101 is located within a communication range 202' of the power transmitting apparatus 101', although a power receiving apparatus 151' is located within the power supply range of the power transmitting apparatus 101', there is a possibility that communication might be established with the power transmitting apparatus 101, which is not the intended one, and communication authentication might be performed. Likewise, the power receiving apparatus 151 is located within the power supply range of the power transmitting apparatus 101, but there is a possibility that communication might be established with the power transmitting apparatus 101', which is not the intended one, and communication authentication might be performed. This is because communication is not always established between apparatuses located within a short distance due to the radio wave propagation conditions, the surrounding environment, the timing of start of communication, and the like.

In such a case, the power transmitting apparatuses may supply electric power to a power receiving apparatus irrespective of the required ability and power receiving ability of the power receiving apparatus, resulting in charging failure and damage to the product and leading to a very dangerous situation. Accordingly, apparatus authentication is necessary to determine whether or not the power receiving apparatus 151 authenticated by the communication unit 109 of the power transmitting apparatus 101 is within the power supply range of the power transmitting apparatus 101. As the apparatus authentication method, in the present embodiment, the power transmitting apparatus 101 determines whether or not the power receiving apparatus 151 to which electric power is being supplied is appropriate, based on the electric power supplied to the power receiving apparatus 151 and the electric power received by the power receiving apparatus 151. Specifically, first, the power transmitting apparatus 101 determines a power value for electric power supplied to the power receiving apparatus 151 authenticated by the communication unit 109, and supplies electric power. The power receiving apparatus 151 transmits the voltage value obtained as a result of the received electric power being rectified, to the power transmitting apparatus 101. If it is confirmed that the voltage value obtained through rectification is equal to a voltage value obtained from electric power obtained by subtracting a loss generated during supply of power to the power receiving apparatus 151 in a non-contact manner, the power transmitting apparatus 101 determines that the power receiving apparatus 151 to which electric power is being supplied is appropriate. In other words, the power transmitting apparatus 101 determines that the power receiving apparatus to which electric power is being supplied is the power receiving apparatus 151 authenticated by the communication unit 109.

The power value of electric power supplied from the power transmitting apparatus 101 to perform apparatus authentication needs to be specific to each power transmitting apparatus. By uniquely assigning the power value to each transmitting apparatus, even in a situation as shown in FIG. 2B, the power transmitting apparatuses can identify their intended power receiving apparatuses. Particularly when the timing at which the power receiving apparatus 151 is arranged in the power supply range of the power transmitting apparatus 101 and the timing at which the power receiving apparatus 151' is arranged in the power supply range of the power transmitting apparatus 101' are close to each other, with the power value used for apparatus authentication being set to be specific to each power transmitting apparatus, the power transmitting apparatus can identify an intended power receiving apparatus. There are various ways to determine the specific power value. For example, a method can be used in which the power transmitting apparatus 101 calculates a specific numerical value from the Mac address of an intended power receiving apparatus 151, and coverts the resulting value into electric power. Another method is also conceivable in which the power transmitting apparatus 101 calculates a specific numerical value by using a random number, and converts the resulting value into electric power. The method for calculating the specific power value can be any method unless the same power value as that of another power transmitting apparatus is used for apparatus authentication.

Figure 3A:
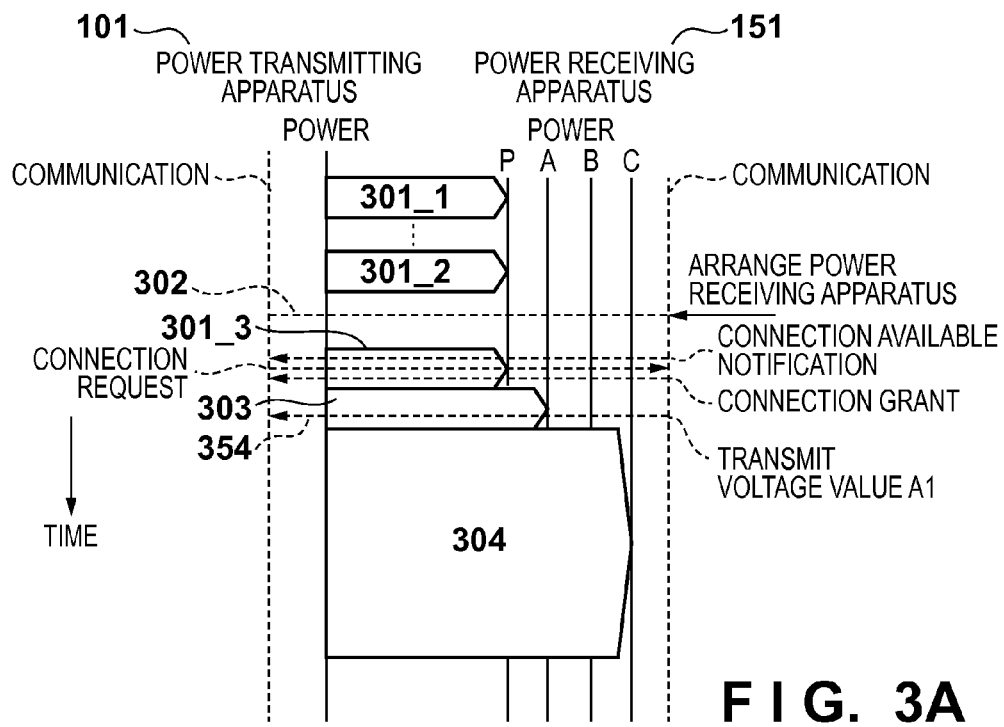
FIGS. 3A to 3D show an operational sequence of operations performed between a power transmitting apparatus and a power receiving apparatus according to the first embodiment.

FIG. 3A to FIG. 3D show an operational sequence of operations of transmission and reception of electric power and communication performed between the power transmitting apparatus 101 and the power receiving apparatus 151 according to the present embodiment. FIG. 4 shows a flowchart of operations of transmission and reception of electric power and communication between the power transmitting apparatus 101 and the power receiving apparatus 151 according to the present embodiment. Operations will be described for transition to a charging phase after apparatus authentication is performed between the power transmitting apparatus 101 and the power receiving apparatus 151, with reference to FIGS. 3A to 3D and FIG. 4. FIG. 3A shows an operational sequence showing the whole operations. Electric power P, A, B and C indicate the levels of strength of electric power output from the power transmitting apparatus 101. The strength increases in order from the electric power P to the electric power C. Dotted lines indicate transmission and reception performed between the communication unit 109 and the communication unit 157. Electric powers 301_1 to 301_3 and electric power 303 indicate electric powers for power-ping and apparatus authentication supplied from the power transmitting apparatus 101. The electric power for power-ping is electric power required for the power receiving apparatus 151 to activate the CPU 152 and the communication unit 157. In the present embodiment, the CPU 152 and the communication unit 157 of the power receiving apparatus 151 are operated by receiving the electric powers 301_1 to 301_3 and the electric power 303. To be specific, the power receiving antenna 155 of the power receiving apparatus 151 receives the electric powers 301_1 to 301_3 and the electric power 303, and the received electric powers are rectified by the rectifier 153. The rectified electric powers are converted into a constant voltage by the constant voltage circuit 154, and supplied to the CPU 152 and the communication unit

157. The CPU 152 and the communication unit 157 that have received the supply of power continue operation. That is, communication is performed between the power transmitting apparatus 101 and the power receiving apparatus 151 only when electric power is supplied from the power transmitting apparatus 101.

First, the power transmitting apparatus 101 supplies electric powers 301_1 to 301_3 for power-ping (S401). The level and the power supply time of the supply powers 301_1 to 301_3 required for power-ping are the level and the time with which the communication unit 157 of the power receiving apparatus 151 can be operated, and are set to "electric power P" level shown in FIG. 3A and the power supply time. The present invention is not limited to a configuration in which the power transmitting apparatus 101 supplies the electric powers 301_1 to 301_3 when the power receiving apparatus 151 is not arranged in the power supply range, and the power transmitting apparatus 101 may be configured to supply the electric powers 301_1 to 301_3 regularly or irregularly. In the case where the power transmitting apparatus 101 supplies the electric powers for power-ping regularly or irregularly, the electric power level and the power supply time are set so as to, when an object other than the power receiving apparatus 151 is arranged in the power supply range, not cause an anomaly in the object such as overheating. The power transmitting apparatus 101 may have a function of stopping power supply instantaneously when an anomaly occurs in the object.

Operations for supplying electric power performed by the power transmitting apparatus 101 will now be described. First, the power transmitting unit 103 is caused to start operation by the CPU 102. The power transmitting unit 103 amplifies the electric power received from the supply line 105, and transmits the amplified electric power to the adjusting unit 104. The adjusting unit 104 adjusts the output level of the supplied power. Specifically, the adjusting unit 104 can adjust the level of the input electric power to a level such as "electric power P", "electric power A", "electric power B", "electric power C" or the like. Hereinafter, the electric powers at the levels of "electric power P", "electric power A", "electric power B", and "electric power C" are respectively referred to simply as "electric power P", "electric power A", "electric power B", and "electric power C". The electric power adjusted as appropriate is transmitted to the power transmitting antenna 111, and supplied to the power receiving apparatus 151. The electric power A, the electric power B, and the electric power C are used as the power values specific to the power transmitting apparatus 101 when apparatus authentication is performed, and the values thereof need to be at levels that do not damage the power receiving antenna 155 and the rectifier 153 of the power receiving apparatus with which communication authentication was performed.

An operational sequence will be described next. In FIG. 3A, the power transmitting apparatus 101 regularly outputs the electric powers 301_1 and 301_2 for power-ping, but because the power receiving apparatus 151 is not provided, operation is not started. It is assumed that at a timing 302, the power receiving apparatus 151 is arranged in the power supply range of the power transmitting apparatus 101 (S402). After that, the power receiving apparatus 151 receives the electric power 301_3 for power-ping so as to operate the CPU 152 and the communication unit 157.

Figure 3B:
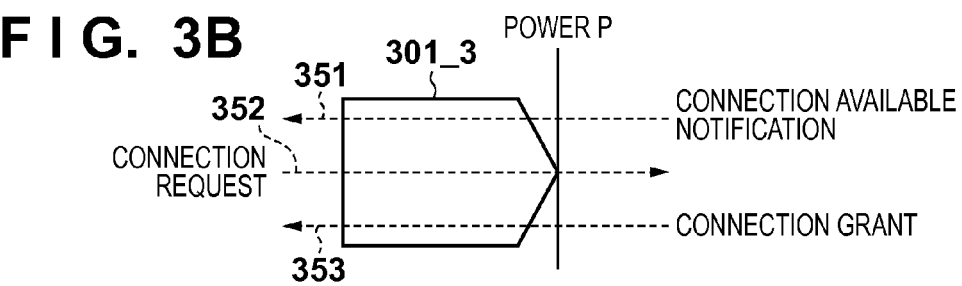
Figure 4:
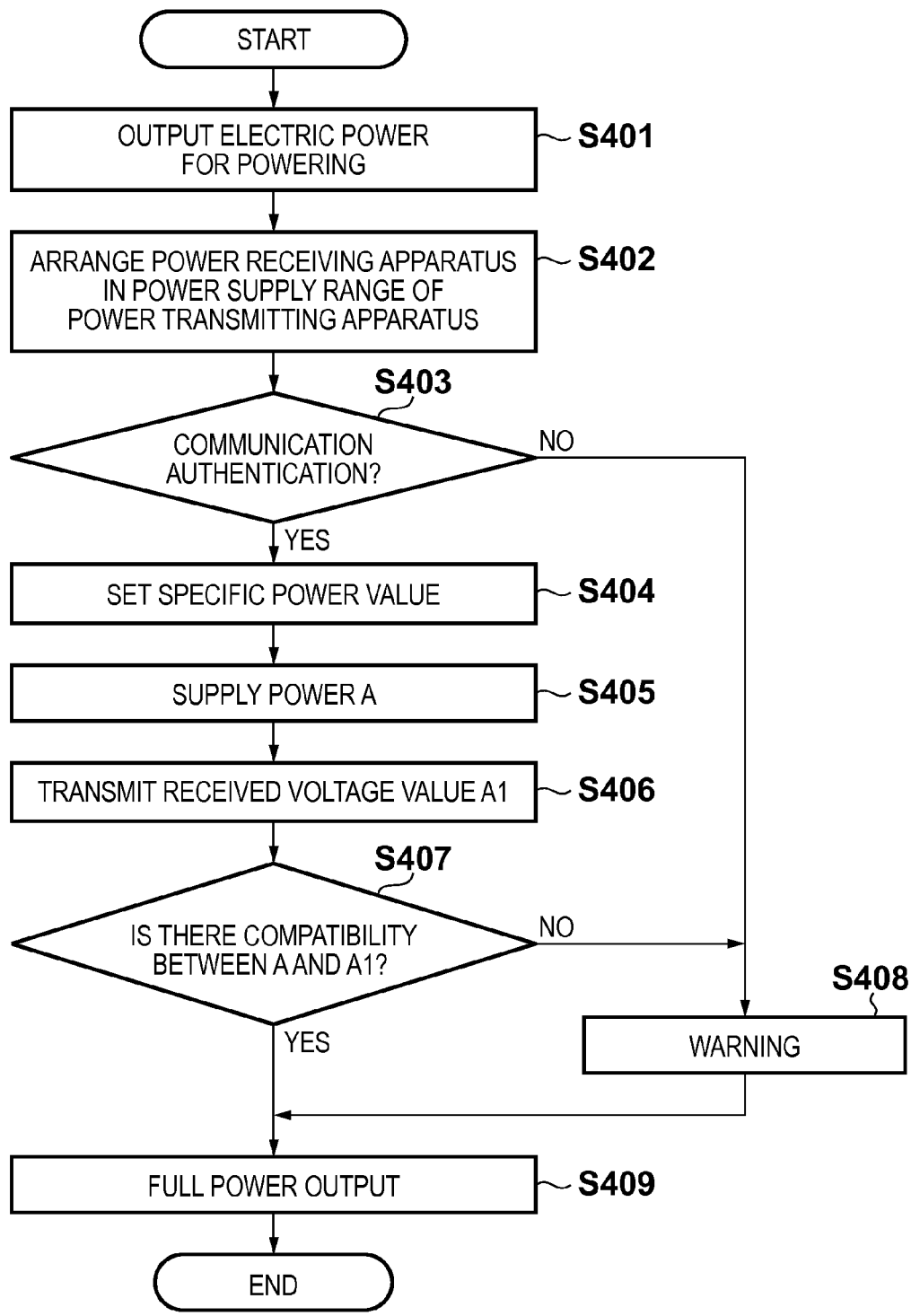
FIG. 4 is a flowchart of operations performed between the power transmitting apparatus and the power receiving apparatus according to the first embodiment.

FIG. 3B shows an enlarged view of the electric power 301_3 as an example of electric power for power-ping. The power receiving apparatus 151 receives the electric power 301_3 supplied from the power transmitting apparatus 101, with the use of the power receiving antenna 155. In the power receiving apparatus 151, the received electric power is rectified by the rectifier 153, converted into a constant voltage by the constant voltage circuit 154, and thereafter supplied to the CPU 152 and the communication unit 157. The switch 161 that controls supply of electric power to the battery 163 is in an off state before the electric power is transitioned to electric power for charging the battery (electric power C in the present embodiment). This is to prevent a situation in which if the switch 161 in an on state, current flows through the battery serving as the load, and the voltage value output from the rectifier 153 used in apparatus authentication varies depending on the charged state of the battery. The CPU 152 that has received supply of power activates the communication unit 157, and the communication unit 157 transmits a connection available notification 351 to the power transmitting apparatus 101. The CPU 102 of the power transmitting apparatus 101 that has received the connection available notification 351 with the use of the communication antenna 110 and the communication unit 109 transmits a connection request 352 to the power receiving apparatus 151, with the use of the communication unit 109 and the communication antenna 110. The power receiving apparatus 151 transmits a connection grant signal 353. In response thereto, the communication unit 109 and the power receiving apparatus 151 of the power transmitting apparatus 101 ends the communication authentication, with the use of the communication unit 157 (YES in S403). This communication authentication merely confirms that electric power can be supplied from the power transmitting apparatus 101 to the power receiving apparatus 151. If the communication authentication fails (NO in S403), a warning is issued from the power transmitting apparatus 101 with the use of a display, a speaker or the like (not shown) (S408).

Apparatus authentication is performed next. The power transmitting apparatus 101 generates electric power A as a power value specific to the power transmitting apparatus 101, which is for use in apparatus authentication with respect to the power receiving apparatus 151 (S404). The CPU 102 operates the adjusting unit 104, and supplies the electric power A303 for use in the apparatus authentication (S405). The electric power 301_3 and the electric power A303 allow the CPU 152 and the communication unit 157 of the power receiving apparatus 151 to perform continuous operation, and thus the power transmitting apparatus 101 continuously supplies the electric power 301_3 and the electric power A303. The power receiving apparatus 151 receives the electric power A303 with the use of the power receiving antenna 155, rectifies the electric power A303 with the use of the rectifier 153, converts the electric power A303 into a constant voltage with the use of the constant voltage circuit 154, and supplies the electric power A303 to the CPU 152 and the communication unit 157 so as to perform continuous operation. Furthermore, the voltage detecting unit 159 connected to the output terminal of the rectifier 153 detects a voltage value A1 that is output as a converted value obtained as a result of rectification of the electric power A output from the power transmitting apparatus 101. The voltage value A1 is output after the transmission loss between the power transmitting antenna 111 and the power receiving antenna 155 and the loss of the rectifier 153 are subtracted. The CPU 152 of the power receiving apparatus 151 transmits the detected voltage value A1 to the power transmitting apparatus 101 via the communication antenna 156 with the use of the communication unit 157 at a timing 354 (S406).

Figure 3C:
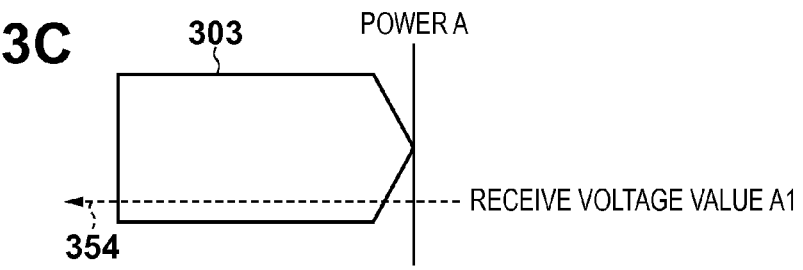
Figure 3D:
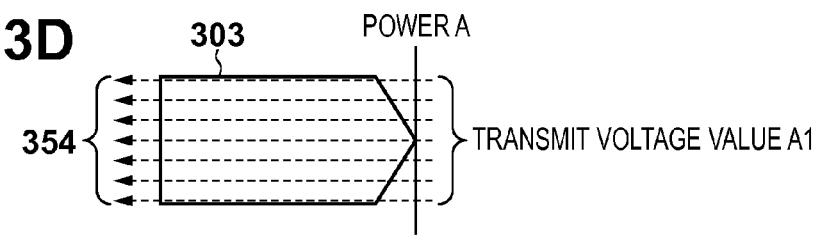

The timing of transmission of the voltage value A1 from the power receiving apparatus 151 may be immediately after detection of the voltage value A1, or after the elapse of a given period of time after detection of the voltage value A1. FIG. 3C shows an example in which the power receiving apparatus 151 transmits the voltage value A1 to the power transmitting apparatus 101 after a given time has elapsed after detection of the voltage value A1. Alternatively, as shown in FIG. 3D, the power receiving apparatus 151 may transmit the voltage value A1 multiple times at a given interval. In this case, the power transmitting apparatus 101 can perform apparatus authentication by receiving the voltage value A1 multiple times. A configuration is also possible in which the power transmitting apparatus 101 supplies electric power for power-ping after supply of the electric power A, and the power receiving apparatus 151 transmits the voltage value A1 while receiving the electric power for power-ping.

The power transmitting apparatus 101 receives the voltage value A1 transmitted from the power receiving apparatus 151 with the use of the communication antenna 110 and the communication unit 109, and recognizes the voltage value A1 with the use of the CPU 102. The determining unit 107 of the power transmitting apparatus 101 knows the transmission loss when electric power is supplied to the power receiving apparatus 151. Accordingly, the determining unit 107 already knows the voltage value (A1 in this example) of the power receiving apparatus 151 corresponding to the power value of the electric power supplied from the power transmitting apparatus 101. Since the voltage value A1 has been transmitted from the power receiving apparatus 151, the determining unit 107 determines that the apparatus within the power supply range of the power transmitting apparatus 101 is the power receiving apparatus 151 authenticated through the communication authentication (YES in S407). Next, the power transmitting apparatus 101 supplies electric power C304 with the use of the adjusting unit 104, the electric power C304 being electric power required by the power receiving apparatus 151 to charge the battery (S409). Note that the power transmitting apparatus 101 continuously outputs the electric power 301_2 for powering, the electric power A303, and the electric power C304. If, on the other hand, the voltage value transmitted by the power receiving apparatus 151 does not match the voltage value known by the determining unit 107, the determining unit 107 determines that the apparatus within the power supply range of the power transmitting apparatus 101 is not the power receiving apparatus 151 authenticated through the communication authentication (NO in S407). In this case, a warning is issued with the use of the display, the speaker or the like (not shown) as in the case where communication authentication fails (S408).

Through the series of operations described above, the power receiving apparatus 151 arranged in the power supply range of the power transmitting apparatus 101 has undergone the communication authentication and the apparatus authentication. Accordingly, the CPU 152 turns on the switch 161 in an off state, supplies the received electric power C to the battery 163 with the use of the charge control unit 162, and starts the operation of charging the battery 163.

Figure 5:
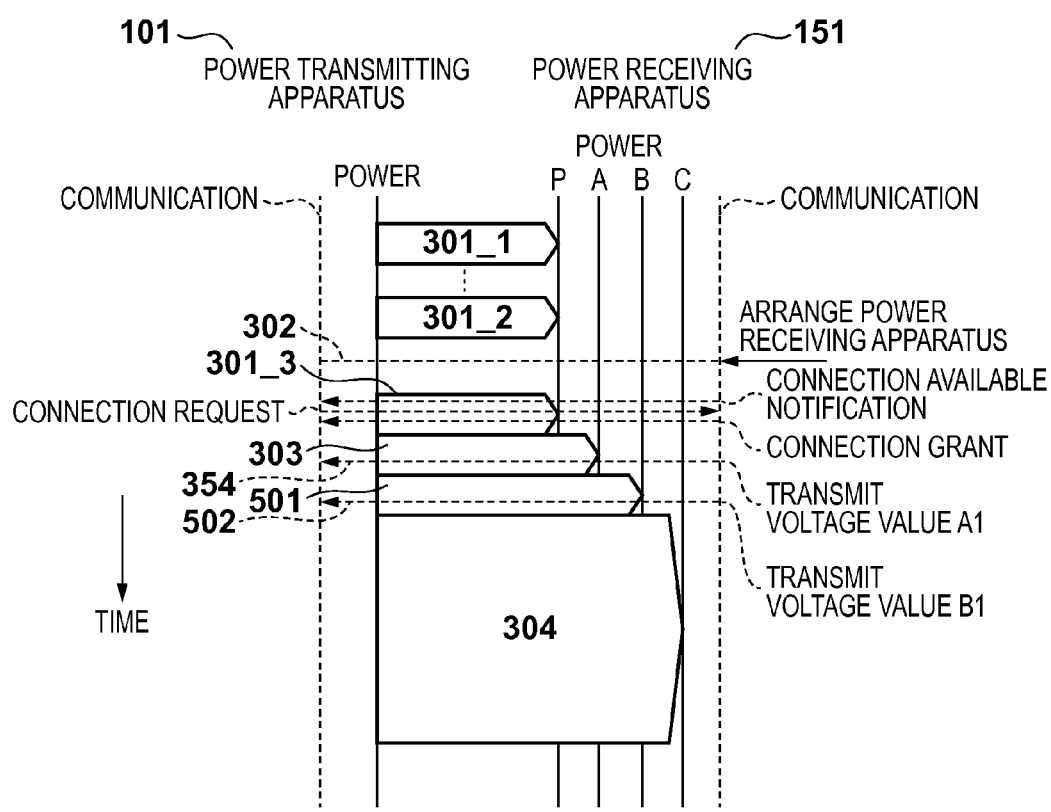
FIG. 5 is an operational sequence 2 of operations performed between the power transmitting apparatus and the power receiving apparatus according to the first embodiment.

Another apparatus authentication method is also conceivable in which a plurality of specific power values supplied from the power transmitting apparatus 101 are output, and voltage values obtained by conversion of the power values by the power receiving apparatus 151 are transmitted. FIG. 5 is an operational sequence of operations of transmission and reception of electric power and communication performed between the power transmitting apparatus 101 and the power receiving apparatus 151 according to another example of the present embodiment. FIG. 5 shows an example in which the power transmitting apparatus 101 supplies two types of electric powers, namely, electric power A and electric power B, as electric powers for use in apparatus authentication. The power receiving apparatus 151 receives the electric power A and the electric power B, and transmits a voltage value A1 and a voltage value B1 obtained by conversion of the received electric power, to the power transmitting apparatus 101. The power transmitting apparatus 101 supplies electric power A303 having a power value specific to the power transmitting apparatus, and the power receiving apparatus 151 transmits, at a timing 354, the voltage value A1 obtained by conversion of the received electric power A303. The power transmitting apparatus 101 that has received the voltage value A1 continuously supplies electric power B501 having a power value specific to the power transmitting apparatus. The power receiving apparatus 151 transmits, at a timing 502, the voltage value B1 obtained by conversion of the received electric power B501. The determining unit 107 of the power transmitting apparatus 101 performs apparatus authentication by determining the compatibility between the electric power A and the voltage value A1, and the compatibility between the electric power B and the voltage value B1. That is, the determining unit 107 determines whether or not the value obtained by subtracting the loss between the power transmitting apparatus 101 and the power receiving apparatus 151 and the loss of the rectifier 153 of the power receiving apparatus is valid.

In this example, two types of electric powers are used to perform apparatus authentication, but the number of types of electric powers is not limited to a particular value as long as the number is one or more. Also, it is effective to configure the power transmitting apparatus 101 to repeatedly supply electric power for apparatus authentication if no compatibility is found with respect to the voltage value transmitted from the power receiving apparatus 151. It is also possible to configure the power receiving apparatus 151 to, when two types of electric powers are used to perform apparatus authentication, transmit the voltage value after the voltage of the power receiving apparatus 151 has changed. In this case, the power receiving apparatus 151 transmits the voltage value A1 while the power transmitting apparatus 101 is supplying the electric power B. Also, the power receiving apparatus 151 transmits the voltage value B1 while the power transmitting apparatus 101 is supplying electric power P for powering after the supply of the electric power B.

The transmission efficiency of power supply from the power transmitting apparatus 101 to the power receiving apparatus 151 may vary depending on the positional relationship between the power transmitting antenna 111 provided to the power transmitting apparatus 101 and the power receiving antenna 155 provided to the power receiving apparatus 151. In this case, the loss between the power transmitting apparatus 101 and the power receiving apparatus 151 is not a known fixed value, and thus the loss varies depending on the position of the power receiving apparatus 151. In this case, the loss during power supply from the power transmitting apparatus 101 to the power receiving apparatus 151 is not a fixed value, but the relationship between the voltage value A1 corresponding to the electric power A and the voltage value B1 corresponding to the electric power B is constant. For example, if the electric power A is 1 W, the voltage value A1 is 2 V, the electric power B is 2 W, and the voltage value B1 is 4 V, it can be said that the relationship between supplied electric power and the voltage value converted from the electric power is constant. Accordingly, the determining unit 107 may authenticate the apparatus if the relationship between the electric power A and the voltage value A1, and the relationship between the electric power B and the voltage value B1 have, for example, a constant ratio (similar shape). At this time, if the position of the power receiving apparatus 151 is changed, the loss ratio between the voltage value A1 and the voltage value B1 is not constant, and thus the power receiving apparatus 151 may not be authenticated by apparatus authentication despite the fact that the power receiving apparatus 151 is an apparatus that should be authenticated. Accordingly, in this case, a warning such as "Don't move" may be displayed on the display (not shown) of the power transmitting apparatus 101 when apparatus authentication is performed.

In the case where the power transmitting apparatus 101 can detect the position of the power receiving apparatus 151, the power transmitting apparatus 101 can perform apparatus authentication by having a correspondence table showing the correspondence between the position of the power receiving apparatus 151 and the transmission efficiency during power supply from the power transmitting apparatus 101 to the power receiving apparatus 151. The determining unit 107 may also perform apparatus authentication by checking the compatibility between the electric power A and the voltage value A1, and the compatibility between the electric power B and the voltage value B1 by multiplying each of the voltage value A1 and the voltage value B1 transmitted from the power receiving apparatus 151 to the power transmitting apparatus 101 by a transmission efficiency selected from the correspondence table.

As described above, according to the present embodiment, by the power transmitting apparatus performing apparatus authentication by using electric power having a power value specific to the power transmitting apparatus, the power transmitting apparatus can appropriately determine that the power receiving apparatus to which power is supplied is the power receiving apparatus authenticated by communication authentication performed in advance.

Second Embodiment

A second embodiment will be described with reference to FIG. 1 and FIGS. 6 to 9. The present embodiment is similar to the first embodiment, and thus a description of overlapping parts will be omitted here. In the first embodiment, the power transmitting apparatus 101 is configured to supply electric power having a power value specific to the power transmitting apparatus, receive a voltage value from the power receiving apparatus 151, and perform apparatus authentication. In the present embodiment, the power transmitting apparatus 101 is configured to transmit electric power having a power value specific to the power transmitting apparatus for a predetermined time, and then, receive a voltage value and the time during which the voltage value is output from the power receiving apparatus 151, and performs apparatus authentication by using both the voltage value and the time.

Figure 6:
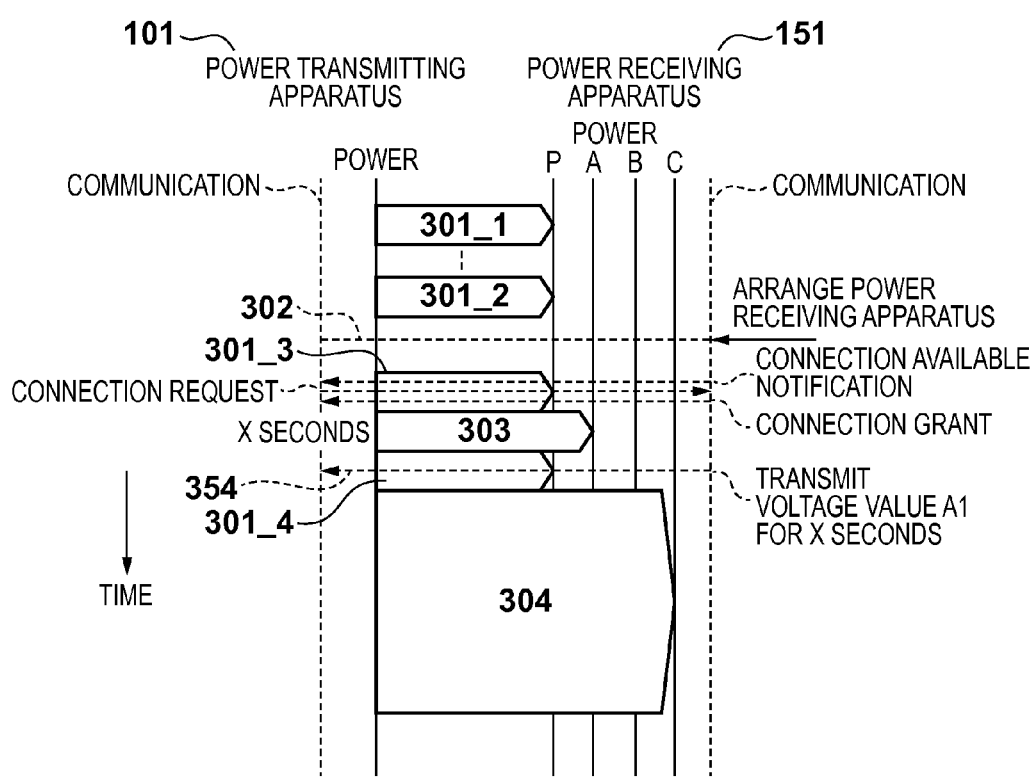
FIG. 6 is an operational sequence of operations performed between a power transmitting apparatus and a power receiving apparatus according to a second embodiment of the present invention.
Figure 7:
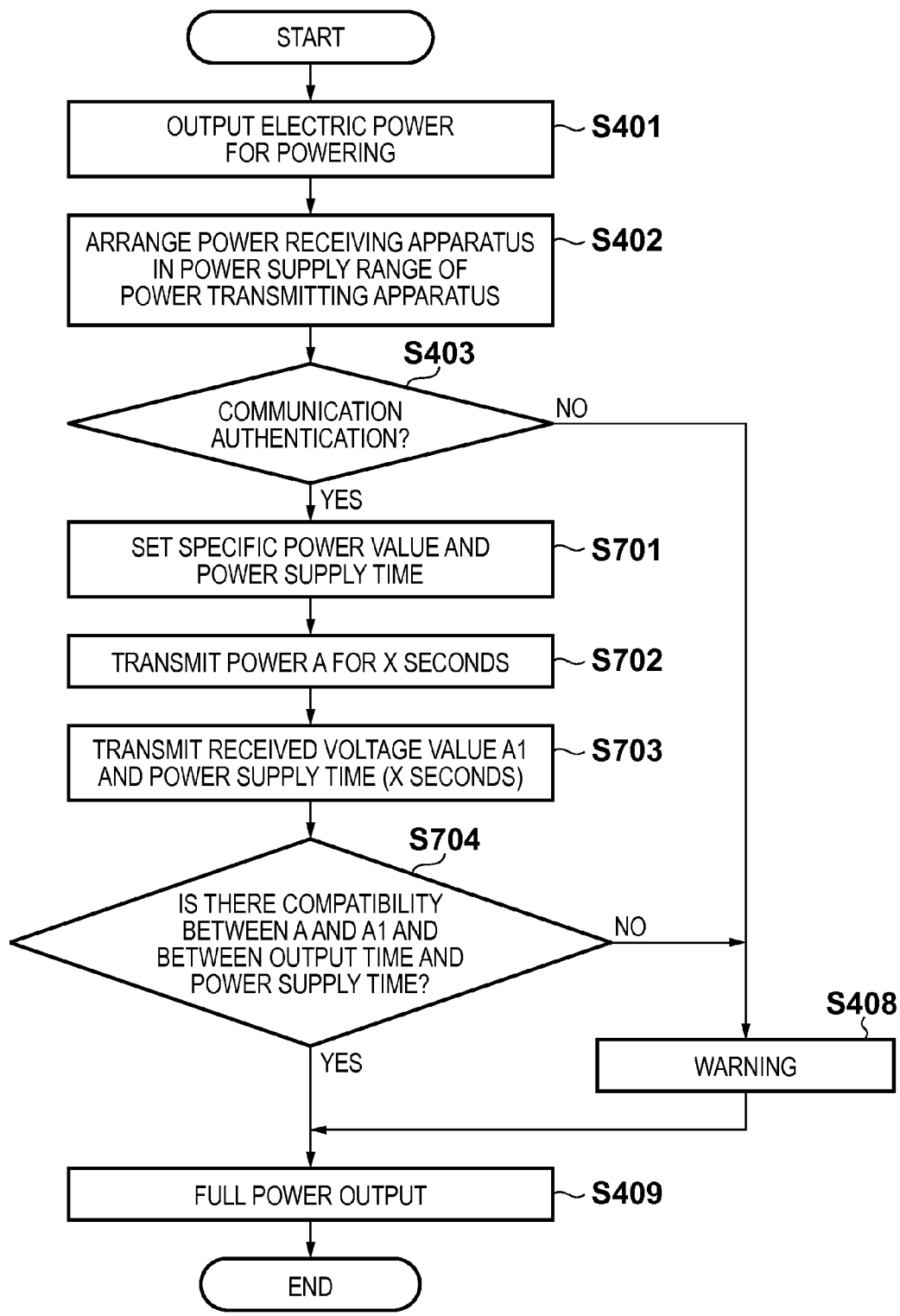
FIG. 7 is a flowchart of operations performed between the power transmitting apparatus and the power receiving apparatus according to the second embodiment.

FIG. 6 is an operational sequence of operations of transmission and reception of electric power and communication performed between the power transmitting apparatus 101 and the power receiving apparatus 151 according to the present embodiment. FIG. 7 is a flowchart of operations of transmission and reception of electric power and communication between the power transmitting apparatus 101 and the power receiving apparatus 151 according to the present embodiment. Operations will be described for transition to a charging phase performed after apparatus authentication is performed between the power transmitting apparatus 101 and the power receiving apparatus 151, with reference to FIGS. 6 and 7.

The power transmitting apparatus 101 supplies electric power 301_1 and electric power 301_2 for powering (S401). After that, it is assumed that the power receiving apparatus 151 is arranged in the power supply range of the power transmitting apparatus 101 at a timing 302 (S402). Next, the power receiving apparatus 151 receives electric power 301_3 for powering, whereby the CPU 152 and the communication unit 157 of the power receiving apparatus 151 are operated, and the communication authentication with the power transmitting apparatus 101 ends (S403). The power transmitting apparatus 101 sets a power value specific thereto, and supplies electric power. The method for generating the specific power value is the same as that described in the first embodiment (S701). Electric power A is generated as the power value specific to the power transmitting apparatus 101. Furthermore, the authentication pattern generating unit 106 sets a power supply time during which the electric power A is supplied. This is also set to a numerical value specific to the power transmitting apparatus. In this example, the power supply time is set to X seconds. The method for generating the specific numerical value of the power supply time is the same as the method for determining the supply power value. The CPU 102 of the power transmitting apparatus 101 sets the level of the electric power A in the adjusting unit 104, and operates the power transmitting unit 103 for X seconds to supply the electric power A for X seconds (303, S702). After transmitting the electric power A for X seconds, the power transmitting apparatus 101 supplies electric power 301_4 for powering, which in turn ends the power supply 303 of the electric power A for X seconds.

The power receiving apparatus 151 rectifies the received electric power A, and thereafter transmits a voltage value A1 and a power receiving time counted by the timer unit 158 to the CPU 152, the power receiving time being the time during which the voltage value A1 was output. The CPU 152 transmits the voltage value A1 and the time during which the voltage value A1 was output, from the communication unit 157 to the power transmitting apparatus 101 while the electric power 301_4 for powering is supplied (S703). The determining unit 107 of the power transmitting apparatus 101 authenticates the apparatus if the voltage value A1 corresponding to the supplied electric power A is equal to the value obtained by subtracting the loss generated during power supply from the power transmitting apparatus 101 to the power receiving apparatus 151, and the output time of the voltage value A1 is equal to the power supply time during which electric power is supplied from the power transmitting apparatus 101 (YES in S704). If the apparatus is not authenticated (NO in S704), a warning is issued from the display, the speaker or the like (not shown) (S408).

Figure 8:
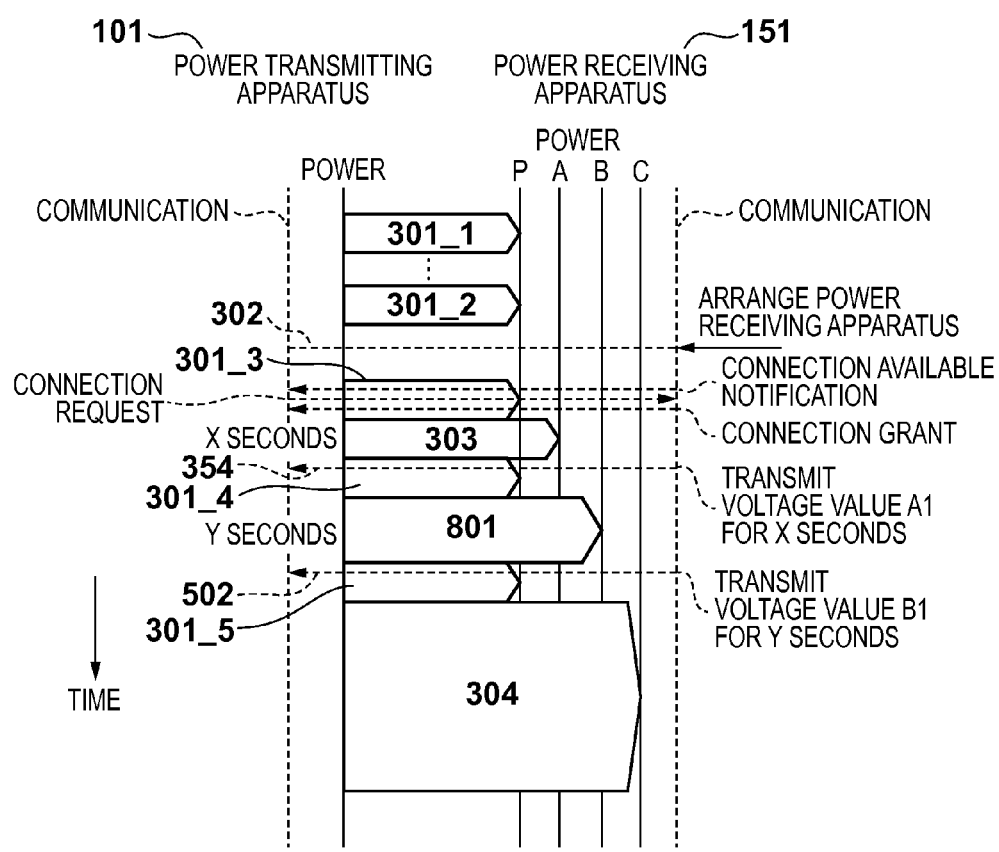
FIG. 8 is an operational sequence 2 of operations performed between the power transmitting apparatus and the power receiving apparatus according to the second embodiment.

The present embodiment has described operations in which only one electric power is used to perform apparatus authentication, but it is also possible to use multiple electric powers to improve the accuracy of authentication. This will be described with reference to FIGS. 8 and 9. FIG. 8 shows an operational sequence of operations of transmission and reception of electric power and communication performed between the power transmitting apparatus 101 and the power receiving apparatus 151 according to another example of the present embodiment. FIG. 9 is a flowchart of operations of transmission and reception of electric power and communication between the power transmitting apparatus 101 and the power receiving apparatus 151 according to another example of the present embodiment.

The power transmitting apparatus 101 supplies electric powers 301_1 and 301_2 for powering (S401). After that, it is assumed that the power receiving apparatus 151 is arranged in the power supply range of the power transmitting apparatus 101 at a timing 302 (S402). Next, the power receiving apparatus 151 receives electric power 301_3 for powering, whereby the CPU 152 and the communication unit 157 of the power receiving apparatus 151 are operated, and the communication authentication with the power transmitting apparatus 101 ends (S403). The power transmitting apparatus 101 sets a power value specific thereto, and supplies electric power. The method for generating the specific power value is the same as that described in the first embodiment (S701). Electric power A is generated as a power value specific to the power transmitting apparatus 101. Furthermore, the authentication pattern generating unit 106 sets a power supply time during which the electric power A is supplied. This is also set to a numerical value specific to the power transmitting apparatus 101. In this example, the power supply time is set to X seconds. Subsequently, the authentication pattern generating unit 106 sets another specific power value and a power supply time. In this example, electric power B and a power supply time of the electric power B are set. Specifically, the power supply time is set to Y seconds. The CPU 102 of the power transmitting apparatus 101 sets the level of the electric power A in the adjusting unit 104, and operates the power transmitting unit 103 for X seconds to supply the electric power A for X seconds (303) (S702). After transmitting the electric power A for X seconds, the power transmitting apparatus 101 supplies electric power 301_4 for powering, which in turn ends the power supply 303 of the electric power A for X seconds.

The power receiving apparatus 151 rectifies the received electric power A, and thereafter transmits a voltage value A1 and a time counted by the timer unit 158 to the CPU 152, the time being the time during which the voltage value A1 was output. The CPU 152 transmits the voltage value A1 and the time during which the voltage value A1 was output, from the communication unit 157 to the power transmitting apparatus 101 while the electric power 301_4 for powering is supplied (S703). Subsequently, the CPU 102 of the power transmitting apparatus 101 sets the level of the electric power B in the adjusting unit 104, and operates the power transmitting unit 103 for Y seconds to supply the electric power B for Y seconds (801) (S901). After transmitting the electric power B for Y seconds, the power transmitting apparatus 101 supplies electric power 301_5 for powering, which in turn ends the power supply 801 of the electric power B for Y seconds.

The power receiving apparatus 151 rectifies the received electric power B, and thereafter transmits a voltage value B1 and a time counted by the timer unit 158 to the CPU 152, the time being the time during which the voltage value B1 was output. The CPU 152 transmits the voltage value B1 and the time during which the voltage value B1 was output, from the communication unit 157 to the power transmitting apparatus 101 while the electric power 301_5 for powering is supplied (S902). The determining unit 107 of the power transmitting apparatus 101 confirms that the voltage value A1 corresponding to the supplied electric power A and the voltage value B1 corresponding to the supplied electric power B are equal to the value obtained by subtracting the loss generated during power supply from the power transmitting apparatus 101 to the power receiving apparatus 151. The determining unit 107 also confirms that the time during which the voltage value A1 was output and the time during which the voltage value B1 was output are equal to the power supply time during which electric power is supplied from the power transmitting apparatus 101, and thereby authenticates the apparatus (YES in S903). If the apparatus is not authenticated (NO in S903), a warning is issued from the display, the speaker or the like (not shown) (S408). Although a configuration was described in which the power transmitting apparatus 101 supplies the electric power 301_4 for powering after the supply of the electric power A, and the power receiving apparatus 151 transmits the voltage value A1 and the power supply time (X seconds) while the electric power 301_4 is supplied, the electric power B may be supplied continuously after the electric power A has been supplied. In this case, information regarding the electric power A is transmitted from the power receiving apparatus 151 to the power transmitting apparatus 101 while the electric power B is supplied.

Also, the transmission efficiency of power supply from the transmitting apparatus 101 to the power receiving apparatus 151 may vary depending on the positional relationship between the power transmitting antenna 111 provided to the power transmitting apparatus 101 and the power receiving antenna 155 provided to the power receiving apparatus 151. In this case, the loss between the power transmitting apparatus 101 and the power receiving apparatus 151 is not a known fixed value, and thus the loss varies depending on the position of the power receiving apparatus 151. In this case, the loss during power supply from the power transmitting apparatus 101 to the power receiving apparatus 151 is not a known value, but the relationship between the voltage value A1 corresponding to the electric power A and the voltage value B1 corresponding to the electric power B is constant. Accordingly, as described in the first embodiment, the determining unit 107 may authenticate the apparatus if the relationship between the electric power A and the voltage value A1, and the relationship between the electric power B and the voltage value B1 have, for example, a constant ratio (similar shape). Needless to say, the accuracy of apparatus authentication can be improved by calculating the ratio between each supplied electric power and its voltage value and determining the compatibility with the power supply time. At this time, if the position of the power receiving apparatus 151 is changed, the loss ratio between the voltage value A1 and the voltage value B1 is not constant, and thus the power receiving apparatus 151 may not be authenticated by apparatus authentication despite the fact that the power receiving apparatus 151 is an apparatus that should be authenticated. Accordingly, in this case, a warning such as "Don't move" may be displayed on the display (not shown) of the power transmitting apparatus 101 when apparatus authentication is performed.

Also, as described in the first embodiment, in the case where the power transmitting apparatus 101 can detect the position of the power receiving apparatus 151, the power transmitting apparatus 101 can perform apparatus authentication by having a correspondence table showing the correspondence between the position of the power receiving apparatus 151 and the transmission efficiency during power supply from the power transmitting apparatus 101 to the power receiving apparatus 151. Also, in the above, two types of electric powers are used to perform apparatus authentication, but the number of types of electric powers is not limited to a particular value as long as the number is one or more.

As described above, according to the present embodiment, by the power transmitting apparatus performing apparatus authentication by using electric power having a power value specific to the power transmitting apparatus and a power supply time, the power transmitting apparatus can appropriately determine that the power receiving apparatus to which power is supplied is the power receiving apparatus authenticated by communication authentication performed in advance.

In the first and second embodiments described above, the voltage value output from the rectifier 153 of the power receiving apparatus 151 is transmitted to the power transmitting apparatus 101 in response to power supply from the power transmitting apparatus 101. The same effects can be obtained by using a current value or the like instead of the voltage value. Likewise, although the voltage value output from the rectifier 153 is detected, the same effects can be obtained by detecting a voltage value output from the power receiving antenna 155 or a voltage value output from the constant voltage circuit 154. The effects of the present invention remain the same if the voltage value and the time during which the voltage value is output are collectively transmitted from the power receiving apparatus 151 to the power transmitting apparatus 101 at a timing after the whole authentication operations have been finished.

Third Embodiment

In the first and second embodiments described above, the CPU 152 and the communication unit 157 of the power receiving apparatus are operated by the electric power for powering from the power transmitting apparatus 101 or the power supplied for apparatus authentication, but they may be operated by a battery provided in the power receiving apparatus. Because the power receiving apparatus 151 is operated by the battery, it is unnecessary to perform authentication during supply of electric power for powering, and power supply is possible as long as the power receiving apparatus 151 is within the communication range 202. In addition, transmission of the voltage value and the power supply time from the power receiving apparatus to the power transmitting apparatus can be performed any time.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-133098, filed Jun. 25, 2013, which is hereby incorporated by reference herein in its entirety.

The invention claimed is:

1. A power transmitting apparatus that transmits electric power to a power receiving apparatus, the power transmitting apparatus comprising:
   a first power transmitting unit configured to transmit, to the power receiving apparatus, first type of electric power having a first power value and second type of electric power having a second power value different from the first power value;
   a second power transmitting unit configured to transmit electric power having a third power value which is larger than the first power value and the second power value;
   a communication unit configured to perform wireless communication wherein a communication range of the communication unit is wider than electric power transmittable range of the first power transmitting unit and the second power transmitting unit; and
   a determination unit configured to determine whether the power receiving apparatus is the destination of power transmission by the second power transmitting unit based on power transmissions with the first type of electric power and the second type of electric power by the first power transmitting unit and communication by the communication unit.

2. The power transmitting apparatus according to claim 1, wherein if the received power result corresponds to the first power value and the second power value, the determination unit determines that the power receiving apparatus is the destination of power transmission by the second power transmitting unit.

3. The power transmitting apparatus according to claim 2, wherein if a first value indicated by the received power result and the first power value satisfy a constant ratio relationship, and a second value indicated by the received power result and the second power value satisfy a constant ratio relationship, the determination unit determines that the power receiving apparatus is the destination of power transmission by the second power transmitting unit.

4. The power transmitting apparatus according to claim 2, further comprising:
   a correspondence table showing a correspondence between a position of the power receiving apparatus and a transmission efficiency during power supply from the power transmitting apparatus to the power receiving apparatus,
   wherein if a converted first value obtained by multiplying a first value indicated by the received power result by a transmission efficiency selected from the correspondence table and the first power value match, and a converted second value obtained by multiplying a second value indicated by the received power result by a transmission efficiency selected from the correspondence table and the second power value match, the determination unit determines that the power receiving apparatus is the destination of transmission power by the second power transmitting unit.

5. The power transmitting apparatus according to claim 2, wherein the communication unit receives the same received power result multiple times.

6. The power transmitting apparatus according to claim 2, wherein the received power result indicates a current value or a voltage value.

7. The power transmitting apparatus according to claim 1, wherein the first power transmitting unit transmits the first type of electric power for a first predetermined time and the second type of electric power for a second predetermined time,
the communication unit receives a first power receiving time of the first type of electric power received by the power receiving apparatus and a second power receiving time of the second type of electric power received by the power receiving apparatus, and
the determination unit performs the determination based on the first and second power receiving time and the first and second predetermined time.

8. The power transmitting apparatus according to claim 1, wherein if the communication unit receives a signal indicating that power supply is possible, the first power transmitting unit transmits the first and second type of electric power.

9. The power transmitting apparatus according to claim 1, wherein the communication unit receives a received power results when the first power transmitting unit transmits the first type of electric power and when the first power transmitting unit transmits the second type of electric power.

10. The power transmitting apparatus according to claim 1,
wherein the second power transmitting unit transmits the electric power required by the power receiving apparatus to the power receiving apparatus in a case where the determination unit determines that the power receiving apparatus is the destination of power transmission by the second power transmitting unit.

11. A power receiving apparatus that receives electric power from a power transmitting apparatus, the power receiving apparatus comprising:
a power receiving unit configured to receive, from the power transmitting apparatus, first type of electric power having a first power value and second type of electric power having a second power value; and
a communication unit configured to perform wireless communication with the power transmitting apparatus to determine whether to receive or not electric power having a third power value which is larger than the first and second power value, wherein a communication range of the communication unit is wider than electric power transmittable range of the power transmission apparatus,
wherein the power receiving unit receives the electric power having the third power value from the power transmission apparatus based on a received power result of the first type of electric power and the second type of electric power by the power receiving unit, and communication by the communication unit.

12. The power receiving apparatus according to claim 11, wherein if the communication unit transmits a signal indicating that power supply is possible, the power receiving unit receives the first and second type of electric power.

13. The power receiving apparatus according to claim 11, the communication unit transmits received power results of the power receiving apparatus to the power transmitting apparatus.

14. A method for controlling a power transmitting apparatus that transmits electric power to a power receiving apparatus, the method comprising:
transmitting, to the power receiving apparatus, first type of electric power having a first power value and second type of electric power having a second power value different from the first power value;
transmitting electric power having a third power value which is larger than the first power value and the second power value;
performing wireless communication wherein a communication range in performing the wireless communication is wider than electric power transmittable range in transmitting the first type of electric power and the second type of electric power; and
determining whether the power receiving apparatus is the destination of transmission of power having the third power value based on power transmissions with the first type of electric power and the second type of electric power and the wireless communication.

15. A method for controlling a power receiving apparatus that receives electric power from a power transmitting apparatus, the method comprising:
receiving, from the power transmitting apparatus, first type of electric power having a first power value and second type of electric power having a second power value;
performing wireless communication with the power transmitting apparatus to determine whether to receive or not electric power having a third power value which is larger than the first and second power value, wherein a communication range in performing the wireless communication is wider than electric power transmittable range of the power transmission apparatus; and
receiving the electric power having the third power value from the power transmission apparatus based on a received power result of the first type of electric power and the second type of electric power, and wireless communication.

16. A non-transitory computer-readable storage medium storing a computer program for causing a computer to execute a method for controlling a power transmitting apparatus that transmits electric power to a power receiving apparatus, the method comprising:
transmitting, to the power receiving apparatus, first type of electric power having a first power value and second type of electric power having a second power value different from the first power value;
transmitting electric power having a third power value which is larger than the first power value and the second power value;
performing wireless communication wherein a communication range in performing the wireless communication is wider than electric power transmittable range in transmitting the first type of electric power and the second type of electric power; and
determining whether the power receiving apparatus is the destination of transmission of power having the third power value based on power transmissions with the first type of electric power and the second type of electric power and the wireless communication.

17. A non-transitory computer-readable storage medium storing a computer program for causing a computer to execute a method for controlling a power receiving apparatus that receives electric power from a power transmitting apparatus, the method comprising:
- receiving, from the power transmitting apparatus, first type of electric power having a first power value and second type of electric power having a second power value;
- performing wireless communication with the power transmitting apparatus to determine whether to receive or not electric power having a third power value which is larger than the first and second power value, wherein a communication range in performing the wireless communication is wider than electric power transmittable range of the power transmission apparatus; and
- receiving the electric power having the third power value from the power transmission apparatus based on a received power result of the first type of electric power and the second type of electric power, and wireless communication.

* * * * *